US012742851B2

(12) United States Patent
Tao et al.

(10) Patent No.: US 12,742,851 B2
(45) Date of Patent: Sep. 22, 2026

(54) LOW COMPLEXITY RECEPTION (RX) BEAMFORMING FOR UPLINK (UL) POSITIONING

(71) Applicant: Nokia Technologies Oy, Espoo (FI)

(72) Inventors: Tao Tao, Shanghai (CN); Daejung Yoon, Massy (FR); Ryan Keating, Chicago, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 464 days.

(21) Appl. No.: 18/251,377

(22) PCT Filed: Nov. 5, 2020

(86) PCT No.: PCT/CN2020/126804
§ 371 (c)(1),
(2) Date: May 1, 2023

(87) PCT Pub. No.: WO2022/094879
PCT Pub. Date: May 12, 2022

(65) Prior Publication Data
US 2024/0019533 A1 Jan. 18, 2024

(51) Int. Cl.
*G01S 5/04* (2006.01)
*G01S 5/00* (2006.01)
*G01S 5/02* (2010.01)

(52) U.S. Cl.
CPC .............. *G01S 5/04* (2013.01); *G01S 5/0081* (2013.01); *G01S 5/0236* (2013.01); *G01S 2205/008* (2013.01)

(58) Field of Classification Search
CPC ........ G01S 5/04; G01S 5/0081; G01S 5/0236; G01S 5/02213
See application file for complete search history.

(56) References Cited

U.S. PATENT DOCUMENTS 8,345,597 B2 * 1/2013 Poisel .................. H04W 64/00 370/252
10,448,355 B2 10/2019 Reial et al.
(Continued)

FOREIGN PATENT DOCUMENTS

CN 1753550 A 3/2006
CN 105165053 A 12/2015
(Continued)

OTHER PUBLICATIONS

Zekavat, Seyed A.et al., “Handbook of Position Location”, 2012, John Wiley & Sons, Inc., 2012, pp. 175, 176, 361 (Year: 2012).*
(Continued)

*Primary Examiner* — Cassi J Galt
(74) *Attorney, Agent, or Firm* — SQUIRE PATTON BOGGS (US) LLP

(57) ABSTRACT

A method includes obtaining, at a location management apparatus of a wireless communications system, information indicating an approximate location of a user device; determining network assistance signaling based on the obtained information of the approximate location of a user device; and sending the determined network assistance signaling to a first network apparatus of the wireless communications system, the determining of the network assistance signaling including determining an expected angle of arrival for the first network apparatus and including the expected angle of arrival in the network assistance signaling, the expected angle of arrival being an angle, or a range of angles, corresponding to a direction from which wireless transmissions from the user device arrive at the first network apparatus.

9 Claims, 10 Drawing Sheets

(56) References Cited

U.S. PATENT DOCUMENTS

| | | | | |
|---|---|---|---|---|
| 2014/0120947 | A1* | 5/2014 | Siomina | G01S 5/02213 455/456.1 |
| 2020/0068355 | A1 | 2/2020 | Edge | |
| 2020/0326405 | A1* | 10/2020 | Silverman | G01S 3/04 |

FOREIGN PATENT DOCUMENTS

| | | | |
|---|---|---|---|
| CN | 110574327 | A | 12/2019 |
| CN | 111213412 | A | 5/2020 |
| CN | 111566498 | A | 8/2020 |
| GB | 2581480 | A | 8/2020 |
| WO | 2020/088350 | A1 | 5/2020 |
| WO | 2020/119893 | A1 | 6/2020 |
| WO | 2020/167890 | A1 | 8/2020 |

OTHER PUBLICATIONS

Office action received for corresponding Chinese Patent Application No. 202080108320.2, dated Aug. 29, 2024, 6 pages of office action and no page translation available.

Office action received for corresponding Chinese Patent Application No. 202080108320.2, dated Mar. 18, 2024, 8 pages of office action and no page of translation available.

"Remaining issues on NR Positioning Measurements", 3GPP TSG RAN WG1 #101, R1-2003634, Agenda: 7.2.8.3, CATT, May 25-Jun. 5, 2020, pp. 1-6.

"DL and UL Reference Signals for NR Positioning", 3GPP TSG RAN WG1 Meeting #96bis, R1-1904004, Agenda: 7.2.10.1, Huawei, Apr. 8-12, 2019, 13 pages.

"3rd Generation Partnership Project; Technical Specification Group Radio Access Network; NG-RAN; NR Positioning Protocol A (NRPPa) (Release 15)", 3GPP TS 38.455, V15.2.1, Jan. 2019, pp. 1-60.

"3rd Generation Partnership Project; Technical Specification Group Radio Access Network; NR; Physical layer procedures for data (Release 16)", 3GPP TS 38.214, V16.1.0, Mar. 2020, pp. 1-151.

Fischer, "Observed Time Difference of Arrival (OTDOA) Positioning in 3GPP LTE", Qualcomm Technologies Inc, Jun. 6, 2014, pp. 1-62.

Msc-Generator, Sourceforge, Retrieved on May 22, 2023, Webpage available at : https://sourceforge.net/projects/msc-generator/.

"3rd Generation Partnership Project; Technical Specification Group Radio Access Network; Evolved Universal Terrestrial Radio Access (E-UTRA); LTE Positioning Protocol (LPP) (Release 15)", 3GPP TS 36.355, V15.6.0, Dec. 2019, pp. 1-8.

"3rd Generation Partnership Project; Technical Specification Group Radio Access Network; NR; Sidelink Positioning Protocol (SLPP); Protocol specification (Release 18)", 3GPP TS 38.355, V0.0.1, Apr. 2023, pp. 1-9.

Akopian et al., "Introduction to WLAN-Based Indoor Positioning of Mobile Devices", S&T International Symposium on Electronic Imaging, Mobile Devices and Multimedia: Enabling Technologies, Algorithms, and Applications , 2017, pp. 5-14.

Patel et al., "5G E2E Technology to Support Verticals URLLC Requirements", Next Generation Mobile Networks (NGMN), Final Deliverable, Version 1.6, Feb. 10, 2020, pp. 1-151.

"5G; NG Radio Access Network (NG-RAN); Stage 2 functional specification of User Equipment (UE) positioning in NG-RAN (3GPP TS 38.305 version 15.0.0 Release 15)", ETSI TS 138 305, V15.0.0 , Sep. 2018, 57 pages.

"3rd Generation Partnership Project; Technical Specification Group Radio Access Network; LTE Positioning Protocol (LPP) (Release 16)", 3GPP TS 37.355, V16.0.0, Mar. 2020, pp. 1-281.

International Search Report and Written Opinion received for corresponding Patent Cooperation Treaty Application No. PCT/CN2020/126804, dated Jul. 26, 2021, 9 pages.

"Views on potential positioning enhancements", 3GPP TSG RAN WG1 #103-e, R1-2008301, Agenda: 8.5.3, Nokia, Nov. 1, 2020, 13 pages.

"NR positioning measurements", 3GPP TSG RAN WG1 Meeting #98bis, R1-1910035, Agenda: 7.2.10.3, Huawei, Oct. 14-20, 2019, 19 pages.

"Assistance data sharing and priority for measurements", 3GPP TSG-RAN WG2 Meeting #111-e, R2-2007634, Qualcomm Incorporated, Aug. 17-28, 2020, pp. 1-24.

"On gNB measurement requirements for NR positioning", 3GPP TSG-RAN WG4 Meeting #94-e, R4-2001919, Agenda: 8.8.2.2, Nokia, Feb. 24-Mar. 6, 2020, pp. 1-7.

Rejection Decision received for corresponding Chinese Patent Application No. 202080108320.2, dated Nov. 28, 2024, 7 pages of Rejection Decision and no pages of translation available.

* cited by examiner

40

LOW COMPLEXITY RECEPTION (RX) BEAMFORMING FOR UPLINK (UL) POSITIONING

RELATED APPLICATION

This application was originally filed as PCT Application No. PCT/CN2020/126804 on Nov. 5, 2020, which is incorporated herein by reference in its entirety.

TECHNICAL FIELD

One or more example embodiments relate generally to wireless communications and, more specifically, to facilitating positioning in Third Generation Partnership Project (3GPP) Fifth Generation (5G) New Radio (NR) networks.

BACKGROUND

Positioning is one of the key enablers for various verticals and use cases that Third Generation Partnership Project (3GPP) Fifth Generation (5G) New Radio (NR) radio aims to support. By obtaining the knowledge relating to approximate/precise positions of the devices, applications such as location-based services, autonomous driving, and industrial Internet of things (IoT) can be enabled with a 5G system. Although accurate positioning typically could be fulfilled by global navigation satellite system (GNSS) techniques such as global positioning system (GPS) techniques, the accuracy provided by such techniques may be insufficient with respect to some scenarios (e.g., indoor scenarios such as factory automation or warehouse management). Thus, RAT-dependent positioning methods based on downlink/uplink signals developed by 3GPP standards (e.g. positioning reference signal (PRS)/sounding reference signal (SRS)) have been extensively studied in long-term evolution (LTE)/NR.

SUMMARY

According to at least some example embodiments, a method includes obtaining, at a location management apparatus of a wireless communications system, information indicating an approximate location of a user device; determining network assistance signaling based on the obtained information of the approximate location of a user device; and sending the determined network assistance signaling to a first network apparatus of the wireless communications system, the determining of the network assistance signaling including determining an expected angle of arrival for the first network apparatus and including the expected angle of arrival in the network assistance signaling, the expected angle of arrival being an angle, or a range of angles, corresponding to a direction from which wireless transmissions from the user device arrive at the first network apparatus.

Obtaining information indicating an approximate location of a user device may include receiving a measurement report from a serving network apparatus serving the user device; and determining the approximate location of a user device at least based on the measurement report and the location of the serving network apparatus serving the user device.

The measurement report may include at least one of the following: a measured angle of arrival indicating an angle, or range of angles, corresponding to a direction from which wireless transmissions from the user device arrive at the serving network apparatus, an estimated distance or a range of estimated distances from the user device to the serving network apparatus, an approximate location of the user device calculated by the serving network apparatus, or a cell coverage of the serving network apparatus.

The determining of the expected angle of arrival may include determining the expected angle of arrival based at least on the obtained information of the approximate location of the user device and the location of the first network apparatus.

According to at least some example embodiments, a method includes receiving, at a serving network apparatus, a positioning request from a location management apparatus; determining, at the serving network apparatus, an approximate location of a user device, in response to receiving the positioning request, the serving network apparatus serving the user device; and sending, by the serving network apparatus, a measurement report indicating the determined approximate location of the user device to the location management apparatus.

Determining the approximate location of the user device may include receiving uplink positioning reference signals from the user device, measuring an angle of arrival with respect to the user device based on the received uplink positioning reference signals, the angle of arrival being a range of angles corresponding to a direction in which the user device is located relative to the serving network apparatus, measuring a distance or a range of distances from the user device to the serving network apparatus based on the received uplink positioning reference signals, and determining the approximate location of the user device based on the angle of arrival and the distance.

According to at least some example embodiments, a method of a first network apparatus of a wireless communications system includes receiving, at the first network apparatus, network assistance signaling including an expected angle of arrival of the first network apparatus with respect to a user device from a location management apparatus of the wireless communications system, the expected angle of arrival being an angle, or range of angles, corresponding to a direction from which wireless transmissions from the user device arrive at the first network apparatus; selecting one or more reception beams based on the expected angle of arrival; using the selected one or more reception beams to receive uplink positioning reference signals from the user device; and performing positioning measurements on the received uplink positioning reference signals.

According to at least some example embodiments, a reception beamforming determination method of a wireless communications system, the wireless communication system including a location management apparatus, a serving network apparatus of a user device, and a first network apparatus, includes sending a positioning request from the location management apparatus to the serving network apparatus; obtaining, at the location management apparatus, information indicating an approximate location of a user device; determining, at the location management apparatus, network assistance signaling based on the obtained information indicating the approximate location of the user device, the determining of the network assistance signaling including determining a first expected angle of arrival for a first network apparatus and including the expected angle of arrival in the network assistance signaling, the expected angle of arrival being an angle, or range of angles, corresponding to a direction from which wireless transmissions from the user device arrive at the first network apparatus; sending the determined network assistance signaling to the first network apparatus; selecting, at the first network apparatus, one or more reception beams based on the expected angle of arrival; transmitting, from the user device, uplink positioning reference signals; using, at the first network apparatus, the selected one or more reception beams to receive the uplink positioning reference signals of the user device; performing, at the first network element, positioning measurements with respect to a position of the user device; and reporting the positioning measurements to the location management apparatus.

The determining of the expected angle of arrival may include determining the expected angle of arrival based at least on the obtained information of the approximate location of the user device and the location of the first network apparatus.

The method may further include receiving the positioning request at the serving apparatus; measuring, at the serving apparatus, the approximate location of the user device, in response to receiving the positioning request; and sending a measurement report indicating the measured approximate location of the user device to the location management apparatus, wherein the information, obtained by the location management apparatus, that indicates the approximate location of the user device includes the measurement report.

The obtaining of the information may indicate the approximate location of the user device includes determining, at the location management apparatus, a cell coverage area of the serving network apparatus, and the information, obtained by the location management apparatus, that indicates the approximate location of the user device may include the determined cell coverage area of the serving network apparatus.

The first network apparatus may be a reception point of a network apparatus in the wireless communications system that is a non-serving network apparatus conducting positioning measurements.

According to at least some example embodiments, a location management apparatus of a wireless communications system includes memory storing computer-executable instructions; and a processor configured to execute the computer-executable instructions, wherein the computer-executable instructions include: obtaining information indicating an approximate location of a user device, determining network assistance signaling based on the obtained information of the approximate location of a user device, and sending the determined network assistance signaling to a first network apparatus of the wireless communications system, the determining of the network assistance signaling including determining an expected angle of arrival for the first network apparatus and including the expected angle of arrival in the network assistance signaling, the expected angle of arrival being an angle, or a range of angles, corresponding to a direction from which wireless transmissions from the user device arrive at the first network apparatus.

The obtaining information indicating an approximate location of a user device may include receiving a measurement report from a serving network apparatus serving the user device; determining the approximate location of a user device at least based on the measurement report and the location of the serving network apparatus serving the user device.

The measurement report may include at least one of the following: a measured angle of arrival indicating an angle, or range of angles, corresponding to a direction from which wireless transmissions from the user device arrive at the serving network apparatus, an estimated distance or a range of estimated distances from the user device to the serving network apparatus, an approximate location of the user device calculated by the serving network apparatus, or a cell coverage of the serving network apparatus.

The determining of the expected angle of arrival may include determining the expected angle of arrival based at least on the obtained information of the approximate location of the user device and the location of the first network apparatus.

According to at least some example embodiments, a serving network apparatus includes memory storing computer-executable instructions; and a processor configured to execute the computer-executable instructions, wherein the computer-executable instructions include: receiving a positioning request from a location management apparatus; determining an approximate location of a user device, in response to receiving the positioning request, the serving network apparatus serving the user device; and sending a measurement report indicating the determined approximate location of the user device to the location management apparatus.

The determining the approximate location of the user device may include receiving uplink positioning reference signals from the user device, measuring an angle of arrival with respect to the user device based on the received uplink positioning reference signals, the angle of arrival being a range of angles corresponding to a direction in which the user device is located relative to the serving network apparatus, measuring a distance or a range of distances from the user device to the serving network apparatus based on the received uplink positioning reference signals, and determining the approximate location of the user device based on the angle of arrival and the distance.

According to at least some example embodiments, a first network apparatus of a wireless communications system includes memory storing computer-executable instructions; and a processor configured to execute the computer-executable instructions, wherein the computer-executable instructions include: receiving, at the first network apparatus, network assistance signaling including an expected angle of arrival of the first network apparatus with respect to a user device from a location management apparatus of the wireless communications system, the expected angle of arrival being an angle, or range of angles, corresponding to a direction from which wireless transmissions from the user device arrive at the first network apparatus, selecting one or more reception beams based on the expected angle of arrival, using the selected one or more reception beams to receive uplink positioning reference signals from the user device, and performing positioning measurements on the received uplink positioning reference signals.

According to at least some example embodiments, a wireless communications system includes a location management apparatus; a serving network apparatus; and a first network apparatus, the location management apparatus being configured to send a positioning request from the location management apparatus to the serving network apparatus, obtain information indicating an approximate location of a user device, determine network assistance signaling based on the obtained information indicating the approximate location of the user device, the determining of the network assistance signaling including determining a first expected angle of arrival for a first network apparatus and including the expected angle of arrival in the network assistance signaling, the expected angle of arrival being an angle, or range of angles, corresponding to a direction from which wireless transmissions from the user device arrive at the first network apparatus, and send the determined network assistance signaling to the first network apparatus, the first network apparatus being configured to select one or more reception beams based on the expected angle of arrival; the user device being configured to transmit uplink positioning reference signals; the first network apparatus being further configured to: use the selected one or more reception beams to receive the uplink positioning reference signals of the user device, perform positioning measurements with respect to a position of the user device, and report the positioning measurements to the location management apparatus.

The determining of the expected angle of arrival may include determining the expected angle of arrival based at least on the obtained information of the approximate location of the user device and the location of the first network apparatus.

The serving network apparatus may be further configured to receive the positioning request at the serving apparatus; measure, at the serving apparatus, the approximate location of the user device, in response to receiving the positioning request; and send a measurement report indicating the measured approximate location of the user device to the location management apparatus, and the information, obtained by the location management apparatus, that indicates the approximate location of the user device may include the measurement report.

The location management apparatus may be configured such that the obtaining of the information indicating the approximate location of the user device includes determining, at the location management apparatus, a cell coverage area of the serving network apparatus, and the information, obtained by the location management apparatus, that indicates the approximate location of the user device may include the determined cell coverage area of the serving network apparatus.

The first network apparatus may be a reception point of a network apparatus in the wireless communications system that is a non-serving network apparatus conducting positioning measurements.

According to at least some example embodiments, method includes receiving, at a user device of a wireless communications network, a UL positioning reference signal configuration message; and transmitting UL positioning reference signals, based on the UL positioning reference signal configuration message, such that the UL positioning reference signals are receivable at a first network apparatus using one or more reception beams that have been selected by the first network apparatus based on an expected angle or arrival, the expected angle of arrival being an angle, or range of angles, corresponding to a direction from which wireless transmissions from the user device arrive at the first network apparatus.

According to at least some example embodiments, a user device of a wireless communications system includes memory storing computer-executable instructions; and a processor configured to execute the computer-executable instructions, wherein the computer-executable instructions include: receiving a UL positioning reference signal configuration message, and transmitting UL positioning reference signals, based on the UL positioning reference signal configuration message, such that the UL positioning reference signals are receivable at a first network apparatus using one or more reception beams that have been selected by the first network apparatus based on an expected angle or arrival, the expected angle of arrival being an angle, or range of angles, corresponding to a direction from which wireless transmissions from the user device arrive at the first network apparatus.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

Figure 1:
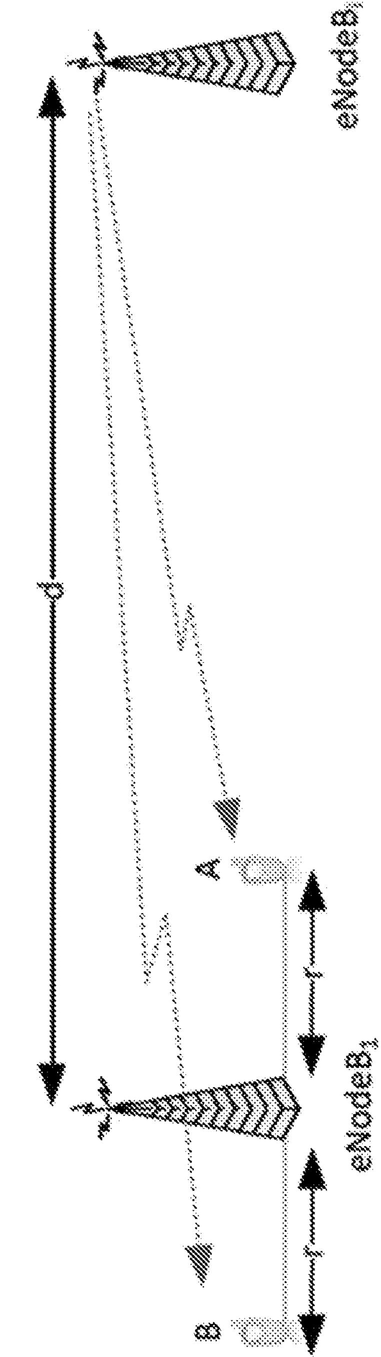
FIG. 1 is a diagram illustrating an example reference signal time difference (RSTD) search window.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

1. Overview of Reception (Rx) Beamforming Determination Method According to at Least Some Example Embodiments, and Example Advantages Thereof In long-term evolution (LTE) positioning there was a logical unit called the location measurement unit (LMU) which could be co-located or non-located with a base station, in order to support uplink (UL) positioning (e.g., uplink-time difference of arrival (U-TDOA)). In Third Generation Partnership Project (3GPP) Fifth Generation (5G) New Radio (NR), this terminology has shifted somewhat and now UL positioning-only reception points (RPs) are supported. These UL positioning-only RPs are capable of receiving UL signals and making positioning measurements (e.g., received time of arrival (RTOA), UL angle of arrival (AoA)).

It is well known in the positioning area that a higher number of measurement points generally increases the positioning accuracy. As very high accuracy is desired or, alternatively, required for some NR positioning use cases it is feasible that UL positioning-only RPs may be deployed to meet these requirements. As the name suggests the UL positioning-only RPs do not transmit reference signals or have the full capabilities of a next generation NodeB (gNB).

In LTE and NR positioning, a location management function (LMF) can predict the reference signal time difference (RSTD) value the user equipment (UE) is expected to measure, and provide a search window to the UE in assistance data sent to the UE.

For example, 3GPP Release 16 (Rel-16) (e.g., 3GPP Technical Specification (TS) 37.355 V16.0.0 (2020-03)) defines the Data-Per-TRP portion of the NR-DL-PRS-AssistanceData information element (IE) as follows:

```
NR-DL-PRS-AssistanceDataPerTRP-r16 ::= SEQUENCE {
  nr-DL-PRS-expectedRSTD-r16              INTEGER (−3841..3841),
  nr-DL-PRS-expectedRSTD-uncerainty-r16   INTEGER (−246..246),
  trp-ID-r16                            TRP-ID-r16      OPTIONAL,
  nr-DL-PRS-Config-r16                    NR-DL-PRS-Config-r16,
  ...
}
```

FIG. 1 is a diagram illustrating an example reference signal time difference (RTSD) search window. FIG. 1 illustrates a portion of a first wireless communications system 40 that includes a first evolved NodeBs (eNB), eNodeB$_1$, and an i$^{th}$ eNB, eNodeB, separated by a distance d. The example in FIG. 1 illustrates an RTSD search window having boundaries A and B, and a radius r.

A typical way to determine Rx beamforming includes performing a beaming training procedure. In a UL based positioning method, Rx beamforming determination at a gNB/transmission and reception point (TRP)/RP-only may include the following steps:

UE shall transmit a reference signal used for positioning (e.g., a sounding reference signal (SRS)) or physical random access channel (PRACH) signal). The reference signal, which may also be referred to in the present specification as a UL positioning reference signal, may be transmitted with repetition (e.g., an SRS may be transmitted with repetition in multiple SRS occasions). While the SRS and PRACH signals are used as examples, the reference signal transmitted by the UE may be any signal used for positioning.

The gNB/TRP/RP-only shall perform Rx beam sweeping, when receiving a reference signal used for positioning (e.g., an SRS) from the UE. More specifically, the UE applies different Rx beams in different SRS occasions.

Based on a measurement (e.g., reference signal received power (RSRP) and/or received signal strength indicator (RSSI)), the gNB/TRP/RP-only can determine the best Rx beams upon which to receive the SRS from the UE for positioning.

The above-referenced Rx beamforming procedure can be very complex, especially when:

UE transmission (Tx) beamforming should be taken into account, particularly in frequency range 2 (FR2).

The UE is moving, which may result in more frequent beam refinement and/or beam failure recovery.

Therefore, it would be desirable to develop a new mechanism in order to reduce the above-referenced complexity, especially for low-cost network devices for positioning (e.g., UL positioning-only RPs) such as asset tracking devices.

According to at least some example embodiments, a low-complexity RX beamforming method at least for gNB/TRP/RP-only with positioning service includes using an LMF to determine an expected/estimated Angle of Arrival (AoA) value and provide the same to gNBs/TRPs/RPs. For example, a low-complexity RX beamforming method according to at least some example embodiments may include at least the following steps which will be discussed in greater detail below with reference to FIGS. 4-9:

1. Acquiring knowledge of an approximate area of a UE (e.g., at an LMF based on information from a serving gNB of the UE);
2. Calculating an expected AoA (eAoA)(e.g., at the LMF);
3. Initiating and providing a network assistance signaling for the eAoA (e.g., from the LMF to an RP-only); and
4. Selecting an Rx beam for UL positioning measurement based on the network assistance signaling (e.g., at the RP-only, based on the eAoA).

According to at least some example embodiments, the UL positioning measurement is made based on one or more UL positioning reference signals from the UE (e.g., SRS). For example, based on one or more UL positioning reference signals from the UE, the RP-only can make various measurements (e.g., received time of arrival (RTOA), uplink-angle of arrival (UL-AoA), gNB reception-transmission (Rx-Tx), SRS-RSRP, etc.)

The low-complexity RX beamforming method according to at least some example embodiments may provide one or more of at least the following advantages:

Beam training overhead reduction e.g., due to a reduced or, alternatively, eliminated need to perform beam sweeping;

Improved positioning estimation performance e.g., due to the availability of more RPs to hear the UE;

Reduced Rx interference; and

Non-line-of-sight (NLOS) filtering reduction.

Examples of an architecture of a wireless communications system and a structure of a network element according to at least some example embodiments, will now be discussed below with reference to FIGS. 2 and 3.

2. Example Architecture of a Wireless Communications System and an Example Structure of a Network Element Thereof FIG. 2 illustrates a second wireless communications system 100 according to at least one example embodiment. As shown in FIG. 2, the second wireless communications system 100 may include a user device 110, a first next generation NodeB (gNB) 120, a reception point (RP) 125; and a core network (CN) node 130. In the example illustrated in FIG. 2, the user device 110 a user equipment (UE). Accordingly, the user device 110 may also be referred to as the UE 110 in the present specification. The UE 110 and the first gNB 120 may communicate with each other wirelessly. According to at least some example embodiments, the first gNB is a serving gNB of the UE 110. Accordingly, the first gNB 120 may also be referred to, in the present specification, as the serving gNB 120. For example, the UE 110 may be attached to a cell of the serving gNB 120, the UE 110 may wirelessly transmit uplink (UL) data to the gNB 120 and the gNB 120 may wirelessly transmit downlink (DL) data to the UE 110. The reception point 125 may receive UL data from the UE 110. According to at last some example embodiments, the RP 125 is an RP-only device. For example, according to at last some example embodiments, the RP 125 is configured to receive UL data wirelessly (e.g., from the UE 110) but is not configured to transmit DL data wirelessly. According to at least some example embodiments, gNBs within the second wireless communications system 100 (e.g., serving gNB 120) may be considered TRPs. Further, according to at least some example embodiments, RP-only devices (e.g., the RP 125) are devices that are configured for wireless reception of data but not wireless transmission of data) and may be referred to in the present specification as an "RP-only" or "RP-only access point (AP)." Further, the CN node 130 may be connected to the serving gNB 120 and the RP 125 and may receive data from, and transmit data to, the serving gNB 120 and the RP 125.

Examples of the UE 110 include, but are not limited to, a mobile device, a tablet, a laptop computer, a wearable device, an Internet of Things (IoT) device, a desktop computer and/or any other type of stationary or portable device capable of operating according to the 5G NR communication standard, and/or other wireless communication standard. In the example illustrated in FIG. 2, the UE 110 is a mobile device.

The CN node 130 is a physical node of a CN of the second wireless communications system 100 and may embody one or more CN elements. According to at least some example embodiments, the CN of the second wireless communications system 100 is, or includes, a 5G core (5GC). As is shown in FIG. 2, one example of a CN element that may be embodied by the CN node 130 is a location management function (LMF). Accordingly, in the present specification, the CN node 130 may also be referred to as the LMF node 130 or the LMF 130. The LMF node may also be referred to in represent application as a location management apparatus. Further, instead of, or in addition to, one or more location management apparatuses being included in the CN of the second wireless communications system 100, one or more location management apparatuses may be included in a radio access network (RAN) of the second wireless communications system 100.

Figure 2:
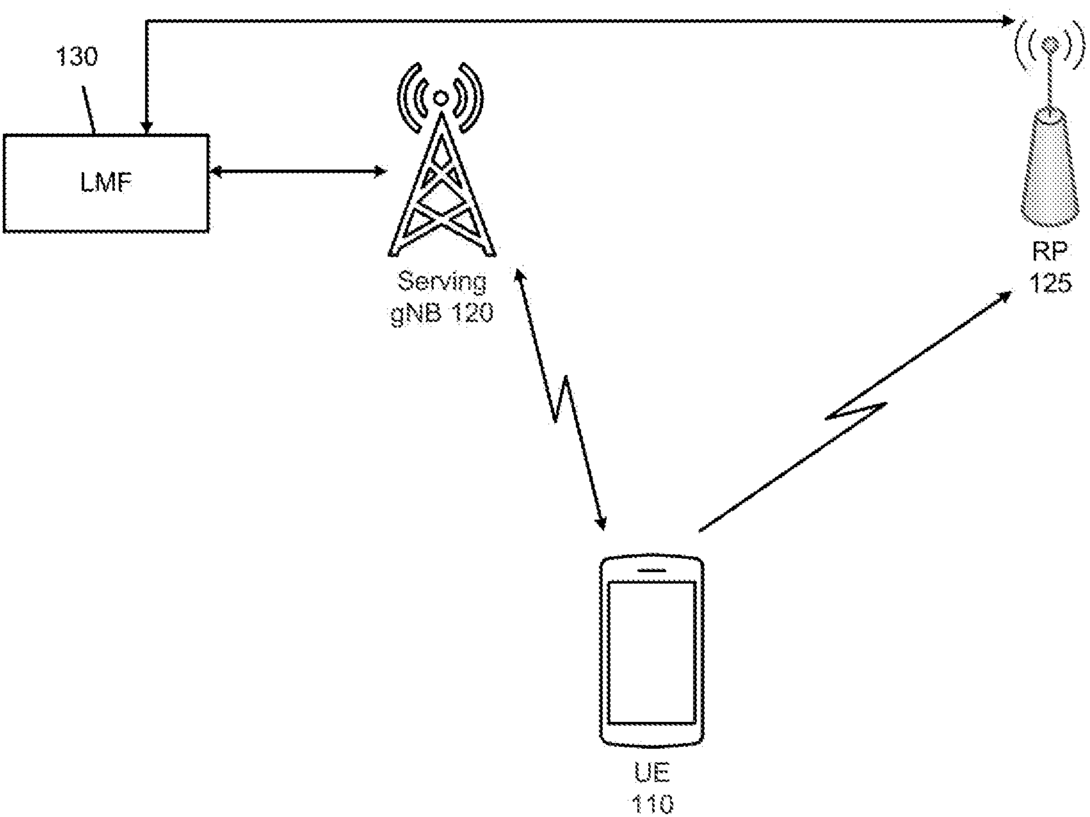
FIG. 2 is a diagram illustrating a portion of a second wireless communications system according to at least some example embodiments.

According to at least some example embodiments, the second wireless communications system 100 is not limited to the elements illustrated in FIG. 2 and the second wireless communications system 100 may include numbers of constituent elements different than those shown in FIG. 2. For example, the second wireless communications system 100 may include any number of UE devices, any number of gNBs, any number of RPs, any number of TRPs, any number of CN nodes, etc.

Additionally, though not illustrated, the second wireless communications system 100 may further include additional 5GC network elements (e.g., in addition to LMF node 130). For example, the gNB 120 may be connected to an access and mobility management function (AMF) element and/or a session management function (SMF) element. Additionally, though not illustrated, the second wireless communications system 100 may further include long-term evolution (LTE) network elements that are connected to the gNB 120. Examples of such LTE elements include, but are not limited to, LTE radio access technology (RAT) network elements (e.g., evolved universal mobile telecommunications system (UMTS) terrestrial radio access network (E-UTRAN) network elements) such as evolved node Bs (eNBs), and LTE core network elements (e.g., evolved packet core (EPC) network elements) such as mobility management entities (MMEs). An example structure which may be used to embody one or more radio network elements (e.g., gNBs, UEs, RPs, TRPs, CN nodes, etc.) of the second wireless communications system 100 will now be discussed below with respect to FIG. 3.

Figure 3:
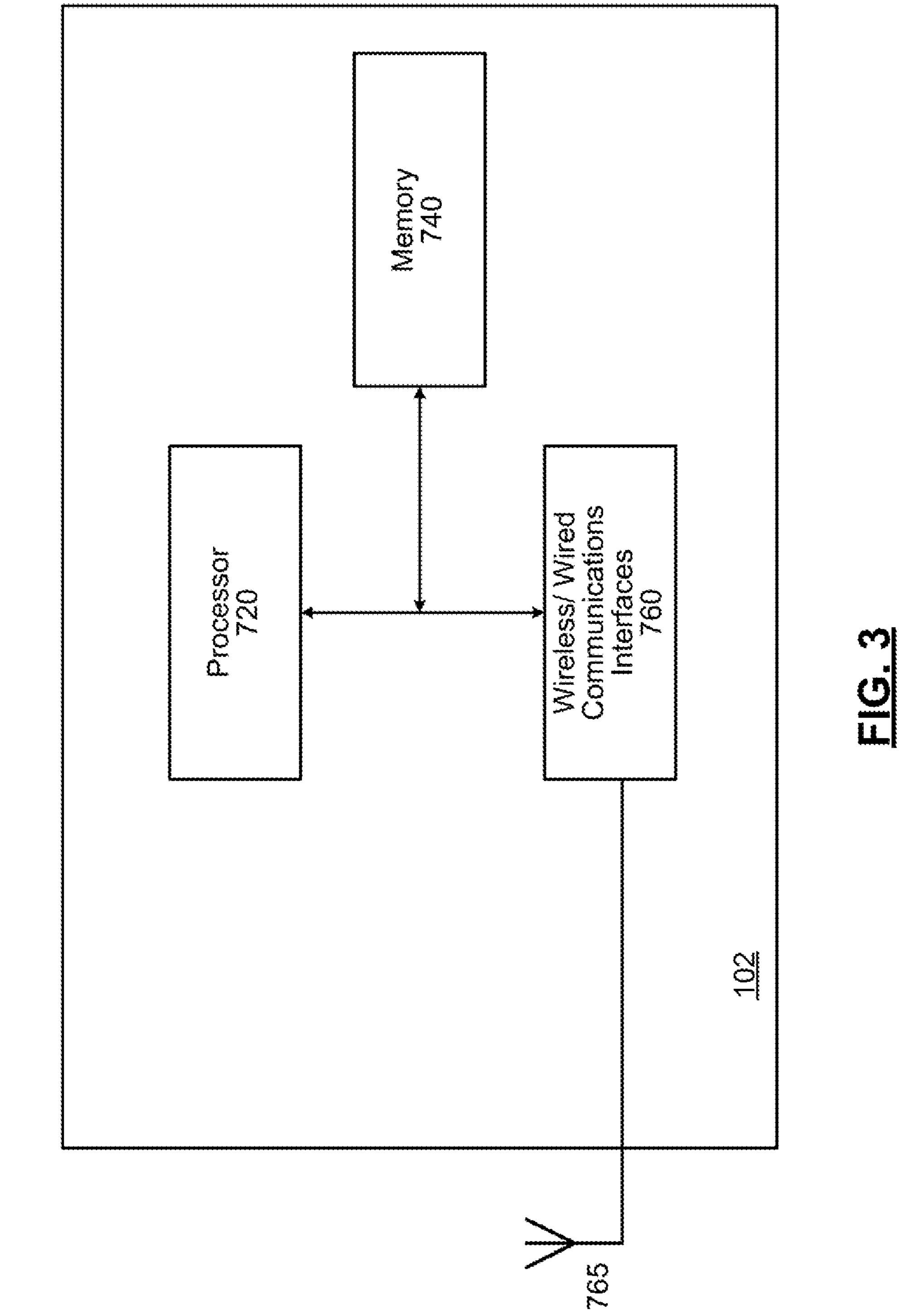
FIG. 3 illustrates a network element according to at least some example embodiments.

FIG. 3 illustrates an example embodiment of a network element. Referring to FIG. 3, a network element 102 includes: a memory 740, a processor 720, and various communications interfaces 760 connected to each other; and one or more antennas or antenna panels 765 connected to the various communications interfaces 760. The various interfaces 760 and the antenna 765 may constitute a transceiver for transmitting/receiving data to/from a UE, a gNB, an RP, a TRP, a CN node, a CN element, and/or another radio network element via one or more of a plurality of wireless beams. According to at least some example embodiments, in addition to, or alternatively, instead of, including interfaces for supporting wireless communications, various interfaces 760 may include interfaces for supporting wired communications.

As will be appreciated, depending on the implementation of the network element 102, the network element 102 may include many more components than those shown in FIG. 3 for providing the functionalities of the particular element of the second wireless communications system 100 being embodied by the network element 102 (e.g., functionalities of a UE, a CN element and/or node, a gNB, an RP, a TRP, etc. in accordance with one or more example embodiments). However, it is not necessary that all of these generally conventional components be shown in order to disclose the illustrative example embodiment.

The memory 740 may be a computer readable storage medium that generally includes a random access memory (RAM), read only memory (ROM), and/or a permanent mass storage device, such as a disk drive. The memory 740 also stores an operating system and any other routines/modules/applications for providing the functionalities of the particular element of the second wireless communications system 100 being embodied by the network element 102 (e.g., functionalities of a UE, a CN element and/or node, a gNB, an RP, a TRP, etc. in accordance with one or more example embodiments) to be executed by the processor 720. These software components may also be loaded from a separate computer readable storage medium into the memory 740 using a drive mechanism (not shown). Such separate computer readable storage medium may include a disc, tape, DVD/CD-ROM drive, memory card, or other like computer readable storage medium (not shown). In some example embodiments, software components may be loaded into the memory 740 via one of the various interfaces 760, rather than via a computer readable storage medium. According to at least some example embodiments, the memory 740 may store computer-executable instructions corresponding to any or all steps discussed with reference to FIGS. 3-6.

The processor 720 may be configured to carry out instructions of a computer program by performing the arithmetical, logical, and input/output operations of the system. Instructions may be provided to the processor 720 by the memory 740.

The various interfaces 760 may include components that interface the processor 720 with the one or more antennas 765, or other input/output components. As will be understood, the various interfaces 760 and programs stored in the memory 740 to set forth the special purpose functionalities of the network element 102 will vary depending on the particular element of the second wireless communications system 100 being embodied by the network element 102.

The various interfaces 760 may also include one or more user input devices (e.g., a keyboard, a keypad, a mouse, or the like) and user output devices (e.g., a display, a speaker, or the like). Example Rx beamforming methods will now be discussed below with reference to FIGS. 4-9.

3. Example Rx Beamforming Methods

Figure 4:
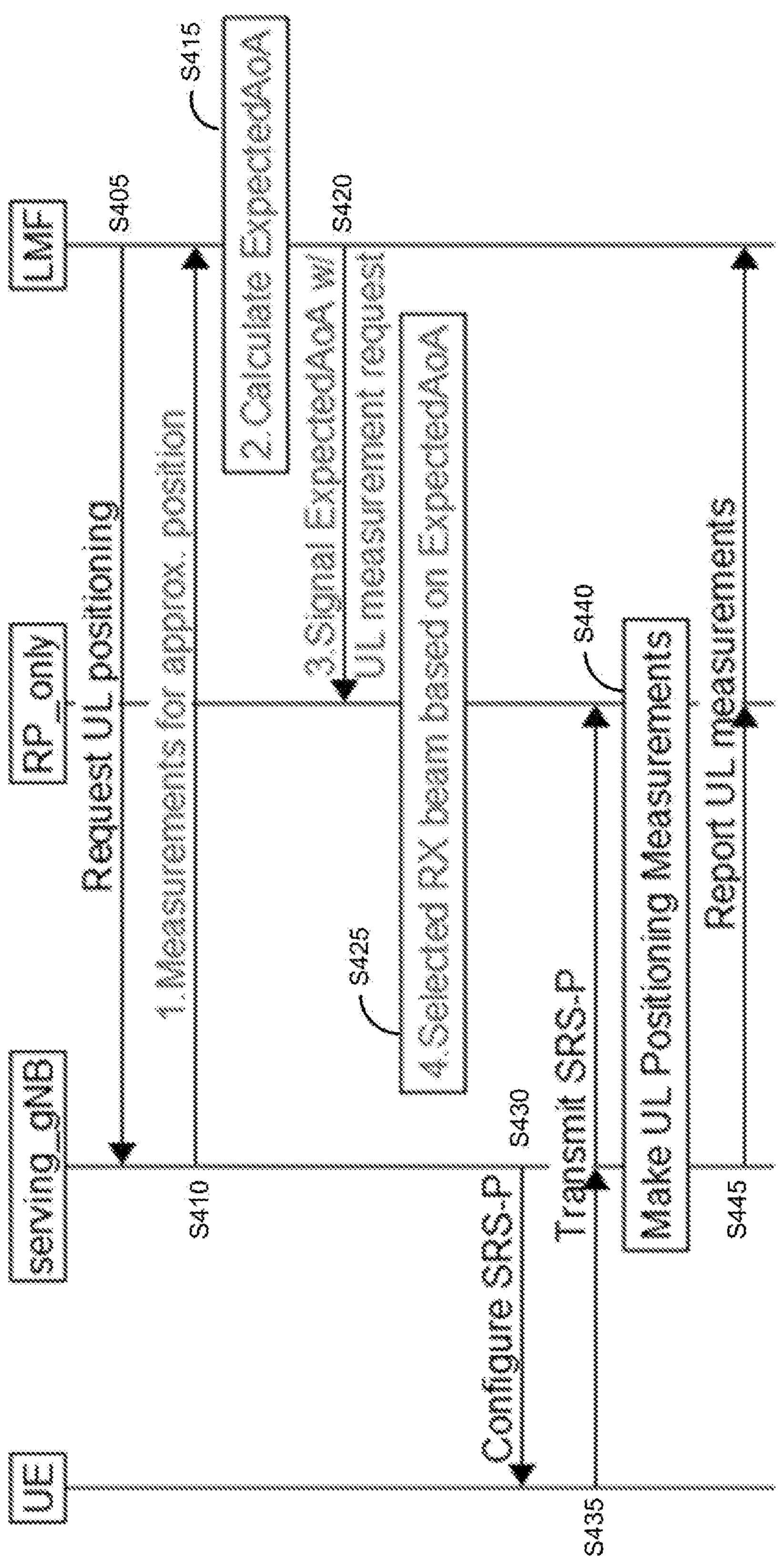
FIG. 4 is a flowchart illustrating an example reception (Rx) beamforming determination method.

FIG. 4 is a flowchart illustrating an Rx beamforming method according to at least some example embodiments. FIG. 4 will be explained below with reference to the second wireless communications system 100 of FIG. 2. For simplicity of explanation, FIG. 4 is explained, primarily, with reference to a scenario in which Rx beamforming is being performed with respect to one or more Rx beams of the RP 125. However, those skilled in the art will understand that the operations described below with reference to the RP 125 may be performed with respect to multiple RPs, one or more base stations (BSs), one or more gNBs, and/or one or more transmission and reception points (TRPs). Further, according to a least some example embodiments, the example Rx beamforming methods may be used with a number of different NR positioning techniques examples of which include, but are not limited to, uplink-time difference of arrival (UL-TDOA), UL-angle of arrival (UL-AoA), enhanced cell ID (E-CID) and other NR UL positioning techniques.

A first example Rx beamforming method according to at least to some example embodiments will be discussed below with reference to FIGS. 4, 5A and 5B; a second example Rx beamforming method according to at least to some example embodiments will be discussed below with reference to FIGS. 4, 6A and 6B; and a third example Rx beamforming method according to at least to some example embodiments will be discussed below with reference to FIGS. 4, 7 and 8.

First Example Rx Beamforming Method

A first example Rx beamforming method according to at least to some example embodiments will now be discussed below with reference to FIGS. 4, 5A and 5B. Referring to FIG. 4, in step S405, the LMF 130 sends a UL positioning request to the serving gNB 120, for example, in accordance with known 5G NR UL positioning procedures. According to at least some example embodiments, the UL positioning request is a request for initiating a positioning procedure to obtain position information of the UE 120.

In step S410, in response to receiving the UL positioning request sent in step S405, the serving gNB 120 performs measurements to determine an approximate position of the UE 110, and reports the measurements to the LMF 130, for example, by sending a measurement report indicating the measurements to the LMF 130. For example, the serving gNB 120 may measure at least one of an angle of arrival (AoA) and a distance with respect to the UE 110. For example, the serving gNB 120 may measure a serving gNB AoA (i.e., an AoA of the serving gNB 120) with respect to the UE 110 (i.e., an angle, or range of angles, corresponding to a direction in which the UE 110 is located relative to the serving gNB 120) based on reference signals, such as UL positioning reference signals, transmitted from the UE. Examples of such UL positioning reference signals include, but are not limited to, an SRS and other UL reference signals or UL positioning signals (e.g., physical random access channel (PRACH) signals). Additionally, the serving gNB 120 may estimate an approximate distance to the UE 110 (e.g., based on a tracking area (TA), reference signal received power (RSRP), received signal strength indicator (RSSI), etc. associated with the UE 110). According to at least some example embodiments a cell identifier (ID) or portion ID may also be used. An example relationship between an approximate position (e.g., an approximate location area) of the UE 110 determined by the serving gNB 120 and measurement values that the gNB 120 may send to the LMF 130 in a measurement report will now be discussed in greater detail below with reference to FIG. 5A.

Figure 5A:
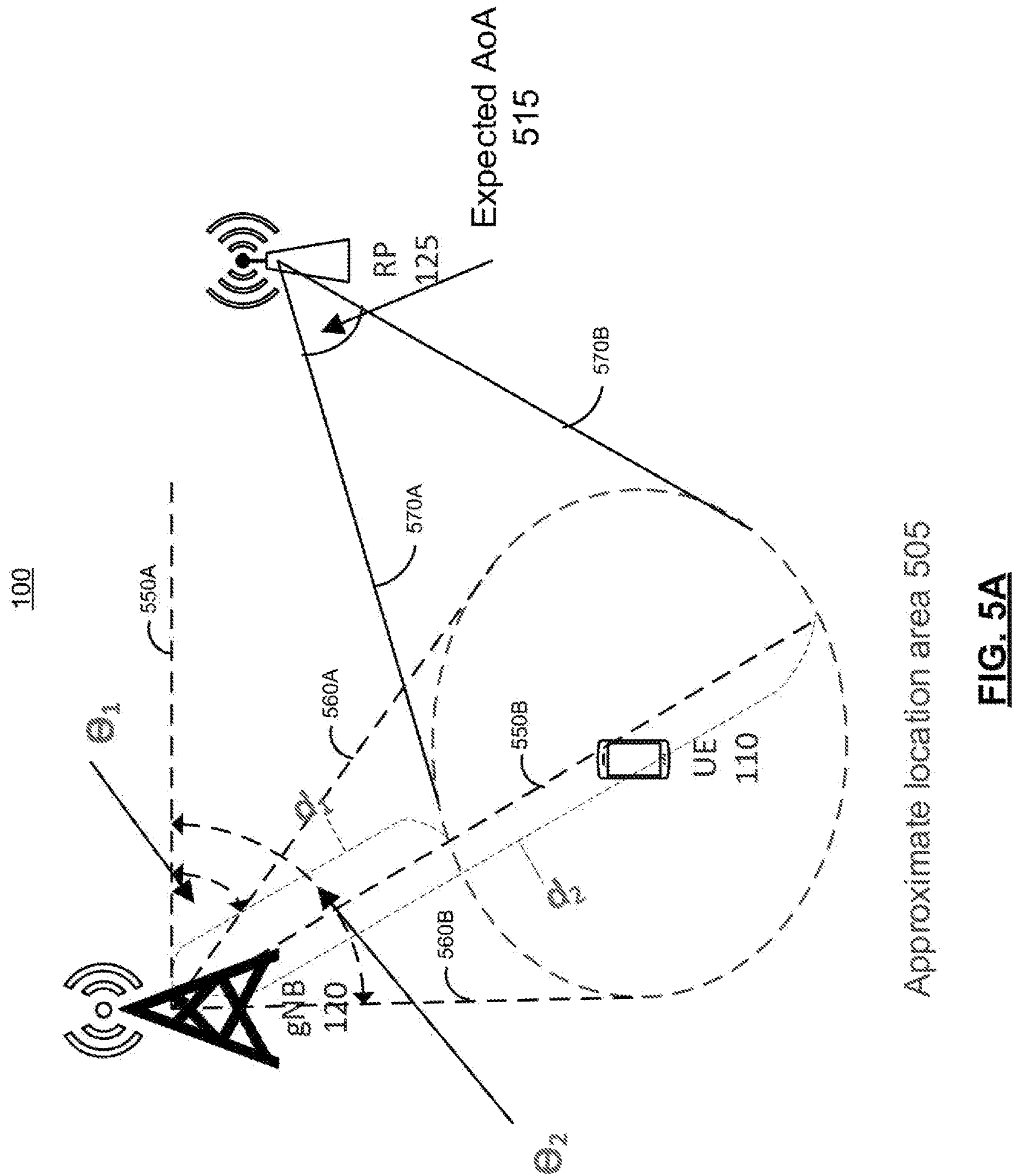
FIG. 5A is a diagram for explaining a first example method of calculating an expected angle of arrival (eAoA), according to at least some example embodiments.

FIG. 5A is a diagram for explaining a first example method of calculating an RP expected angle of arrival (eAoA), according to at least some example embodiments. As is noted above, according to at least some example embodiments, the measurement report sent by the serving gNB 120 to the LMF 130 in step S410 may include one or more of a measured serving gNB AoA value and an estimated distance (e.g., from the UE to the serving gNB 120).

According to at least some example embodiments, the measured serving gNB AoA value included in the measurement report can be reported in the form of a range of angles (e.g., $[\theta_1, \theta_2]$). For example, as is illustrated in FIG. 5A, angles $\theta_1$ and $\theta_2$, from the range of angles $[\theta_1, \theta_2]$, may be defined as follows: angle $\theta_1$ is an angle between a first reference line 550A, which extends from the serving gNB 120, and a first serving gNB tangent line 560A, which extends from the serving gNB 120 and is tangent with respect to a first side of a boundary of an approximate location area 505; and angle $\theta_2$ is an angle between the reference line 550 and a second serving gNB tangent line 560B, which extends from the serving gNB 120 and is tangent with respect to a second side of a boundary of an approximate location area 505, opposite the first side.

According to at least some example embodiments, the estimated distance included in the measurement report can be reported in the form of a range of distance values (e.g., [$d_1$, $d_2$]). For example, as is illustrated in FIG. 5A, distance values $d_1$ and $d_2$ may be distances between near and far points of intersection between a second reference line 550B and the boundary of the approximate location area 505. As is illustrated in FIG. 5A, according to at least some example embodiments, the second reference line 550B passes through a center or central portion of the approximate location area 505 and intersects with two different points (e.g., a point nearer to the serving gNB 120 and a point farther from the serving gNb 120) on the boundary of the approximate location area 505.

Accordingly, the approximate location area 505, as defined by the range of distance values [$d_1$, $d_2$] and the range of angles [$\theta_1$, $\theta_2$] included in a measurement report sent to the LMF 130, is one example of the approximate position of the UE 110 that is indicated by the measurements reported from the serving gNB 120 to the LMF 130 by in step S410.

Alternatively, according to at least one example embodiment, one or both of the UE 110 and the serving gNB 120 may directly report the approximate location of the UE 110 to the LMF 130 based on local estimation, for example, in accordance with known location estimating methods.

Returning to FIG. 4, after the LMF 130 receives an indication of the approximate position of the UE 110 in step S410, the LMF 130 calculates the RP eAoA (i.e., an eAoA of the RP 125) with respect to the UE 110 (i.e., an angle, or range of angles, corresponding to a direction in which the UE 110 is located relative to the RP 125) in S415. For example, according to at least some example embodiments, the LMF 130 may use the measurements from measurement report received from the serving gNB 120 (e.g., the range of distance values [$d_1$, $d_2$] and the range of angles [$\theta_1$, $\theta_2$]) to determine the approximate location area 505 of the UE 110 as the approximate position of the UE 110. Further, because a geographical location of the RP 125 is known by the second wireless network 100, in step S415, the LMF 130 may use the approximate position of the UE 110 to determine an RP eAoA 515. For example, according to at least some example embodiments, based on the indicated position of the UE 110 (e.g., the approximate location area 505), and the known geographical location of the RP 125, the LMF 130 may determine: a first RP tangent line 570A, which extends from the RP 125 and is tangent with respect to a third side of the boundary of an approximate location area 505; and a second RP tangent line 570B, which extends from the RP 125 and is tangent with respect to a fourth side of the boundary of an approximate location area 505, opposite the third side. As is illustrated in FIG. 5A, the LMF 130 may determine the RP eAoA 515 as, for example, an angle or a range of angles in between the first and second RP tangent lines 570A and 570B.

After the LMF 130 determines the eAoA 515 in step S415, the LMF 130 may signal the RP eAoA to the RP 125 along with a UL measurement request (i.e., a request for the RP 125 to make UL positioning measurements) in step S420. For example, the LMF 130 may generate network assistance signaling including the RP eAoA and send the network assistance signaling and the UL measurement request to the RP 125. For example, according to at least some example embodiments, the RP eAoA 515 may be included in the network assistance signaling transmitted to the RP 125 in step S420 in the form of a new ExpectedAoA IE.

According to at least some example embodiments, the ExpectedAoA IE can be signaled to the RP 125 as, for example, an 8-bit number, which represents 1.5 degree granularity. In at least one embodiment the ExpectedAoA can be a single azimuth angle (i.e., in 2D space), ExpectedAoA_azimuth. In at least another embodiment the ExpectedAoA can be both an azimuth and elevation angle (i.e., 3D space), ExpectedAoA_azimuth and ExpectedAoA_elevation. Further, The ExpectedAoA signaling structure could also include an uncertainty window ExpectedAoA_uncertainty (e.g., to represent a range of values) to assist the RP 125 in performing beamforming. The uncertainty window would be a single value interpreted as a plus/minus (e.g., +/−4, +/−22, etc.). For example, an uncertainty of 5 degrees for an eAoA of 50 degrees means the RP can expect the RP AoA to be within 45-55 degrees. Accordingly, by using the uncertainty window ExpectedAoA_uncertainty, the new ExpectedAoA IE can identify an eAoA as a range of angles.

For example, according to at least some example embodiments, the new ExpectedAoA IE may be structured as follows:

| ExpectedAoA:{ | | |
|---|---|---|
| ExpectedAoA_azimuth | Integer (0, ..., 255) | Mandatory |
| ExpectedAoA_elevation | Integer (0, ..., 127) | Optional |
| ExpectedAoA_uncertainty | Integer (0, ..., 63) | Optional |
| } | | |

In step S425, in response to the LMF 130 signaling the RP eAoA to the RP 125 along with the UL measurement request in step S420, the RP 125 may select one or more Rx beams based on the RP eAoA 515.

For example, according to at least one example embodiments, in step S420, the RP 125 selects an Rx beam in order to beamform the reception of an UL positioning reference signaling (e.g., SRS) of the UE 110 for positioning. The RP 125 may select the Rx beam based on the RP eAoA 515. For example, the RP 125 may map the RP eAoA 515 to Rx beam codepoints by selecting the direction of the center of the RX beam that is closest to the RP eAoA 515 indicated by the LMF.

Figure 5B:
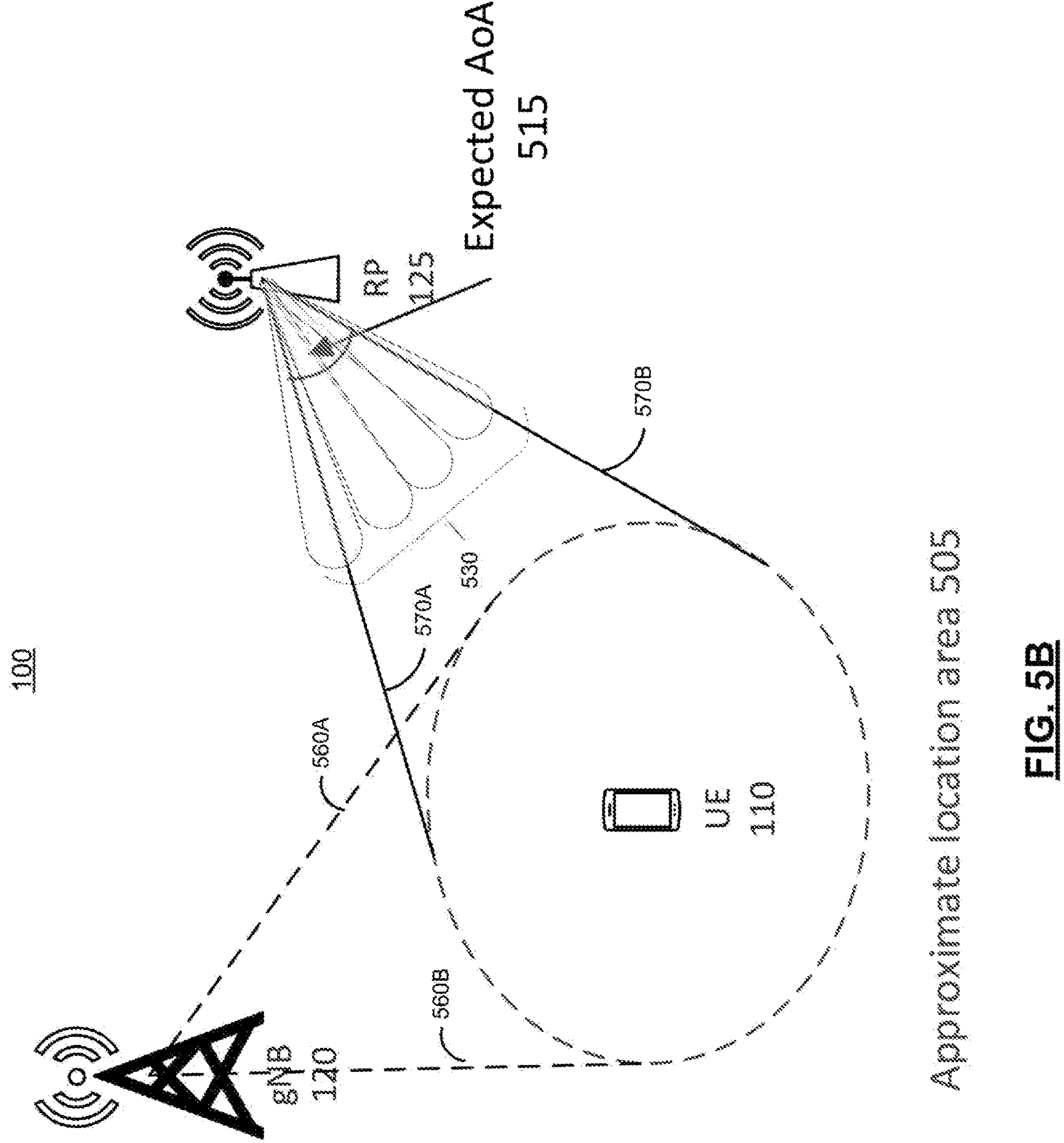
FIG. 5B is a diagram for explaining Rx beam selection by a reception point (RP) in FIG. 5A, according to at least some example embodiments.

In the case of the RP eAoA 515 includes an uncertainty (e.g., ExpectedAoA_uncertainty) which is larger than one beam, the RP may decide to perform RX beam sweeping on a subset of beams (e.g., 2, 4 or more Rx beams which cover the uncertainty range), as shown in FIG. 5B. FIG. 5B is a diagram for explaining Rx beam selection by an RP in FIG. 5A. In the example illustrated in FIG. 5B, the RP 125 can conduct RX beam search by relying on an expectedAoA range included in the network assistance signaling. RP125 determines that a first subset of four Rx beams corresponds to the RP eAoA 515, and thus, selects the first subset of Rx beams (i.e., first Rx beams 530) to receive, respectively four SRS of the UE 110 for UL positioning. The selection of Rx beams with the Expected AoA signaling still represents a significant beam training and sweeping overhead as the RP 125 only needs to receive 4 SRS for positioning resources in order to determine, from among the four first Rx beams 530, which beam is most desirable for receiving an SRS of the UE 110.

Thus, as is discussed above, according to at least some example embodiments, the RP 125 may use the RP eAoA 515 to select an Rx beam or a subset of Rx beams to use for measuring UL positioning reference signals (e.g., SRS) of the UE 110. For example, the RP 125 may determine, based on an uncertainty value associated with the RP eAoA 515, when to select multiple Rx beams. Further, according to at least one other example embodiment, the RP 125 may determine an RX beam width based on the uncertainty value (e.g., if a low uncertainty range then the RP 125 can select a narrow Rx beam, and if a higher uncertainty range then the RP 125 can select a wider Rx beam and/or multiple Rx beams).

In step S430, the serving gNB 120 signals the UE 110 to configure the UE 110 to send UL positioning reference signals (e.g., periodic SRS (SRS-P or P-SRS)) for the UE 110. For example, in step S430, the serving gNB 120 may transmit a UL positioning reference signal configuration message to the UE 110 in accordance with known 5GNR techniques. In step S435, the UE transmits UL positioning reference signals (e.g., periodic SRS (SRS-P or P-SRS)) to the RP 125, for example, based on the manner in which the UE 110 was configured in response to the UL positioning reference signal configuration message received in step S430. In step S440, the serving gNB 120 and RP 125 make UL positioning measurements based on the UL positioning reference signals of the UE 110. In Step S445, the serving gNB 120 and the RP 125 report the UL measurements made in step S440 to the LMF 130. According to at least some example embodiments, steps S430, S435, S440 and S445 are performed in accordance with known 5G NR UL positioning procedures. Further, according to at least some example embodiments, in step S440, the RP 125 uses only the one or more selected Rx beams selected in step S425 (e.g., the first Rx beams 530 of FIG. 5B) to make positioning measurements based on the UL positioning reference signals (e.g., the SRSs) of the UE 110, thus reducing the amount of network resources associated with performing a beam sweeping operation for UL position by reducing the number of Rx beams included in the beam sweeping operation.

Second Example Rx Beamforming Method

A second example Rx beamforming method according to at least to some example embodiments will now be discussed below with reference to FIGS. 4, 6A and 6B. The second example Rx beamforming method will be discussed with reference to a scenario in which the second wireless network 100 further includes a neighbor gNB 127 instead of, or in addition to, the RP 125. According to at least some example embodiments, in addition to, or instead of, determining one or more Rx beams for receiving UL positioning reference signals (e.g., SRS) of the UE 110 with respect to the RP 125, as is discussed above with respect to the first example Rx beamforming method, one or more Rx beams for receiving UL positioning reference signals (e.g., SRS) of the UE 110 may be determined with respect to a neighbor gNB. For example, FIG. 6A is a diagram for explaining a second example method of calculating an eAoA, according to at least some example embodiments, and FIG. 6B is a diagram for explaining Rx beam selection by a neighbor next generation NodeB (gNB) in FIG. 6A, according to at least some example embodiments.

Figure 6A:
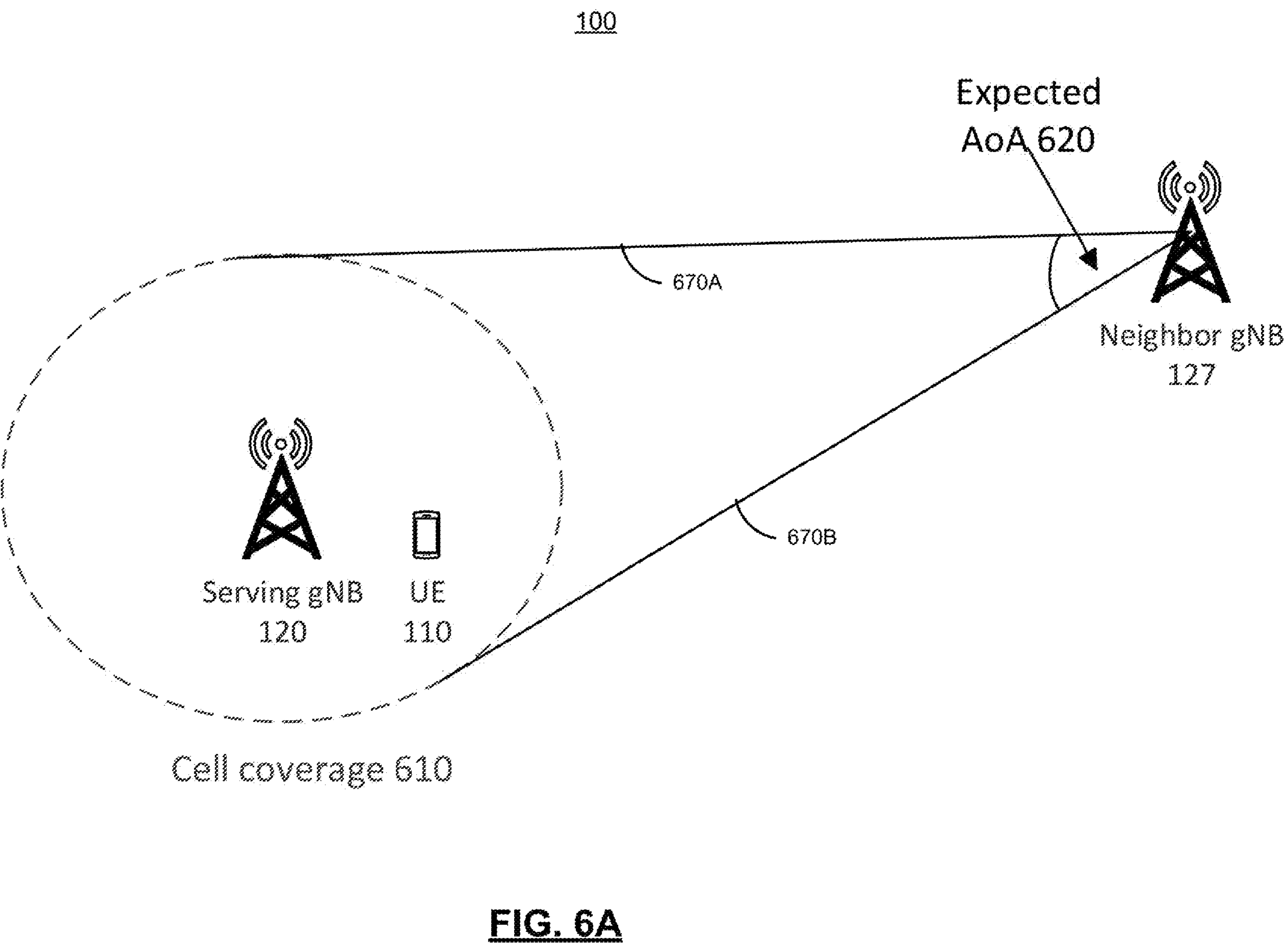
FIG. 6A is a diagram for explaining a second example method of calculating an eAoA, according to at least some example embodiments.
Figure 6B:
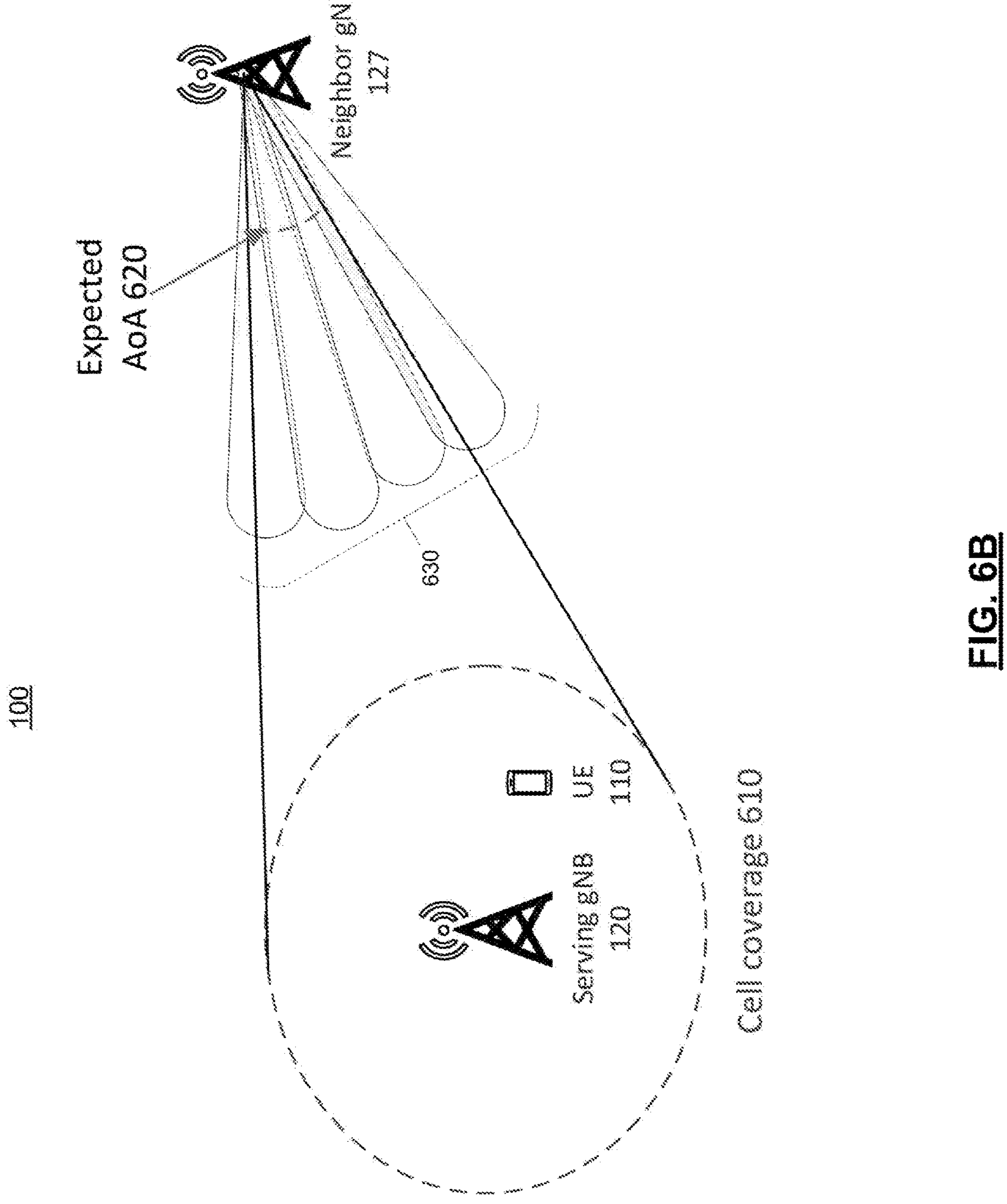
FIG. 6B is a diagram for explaining Rx beam selection by a neighbor next generation NodeB (gNB) in FIG. 6A, according to at least some example embodiments.

Referring to FIG. 4, in second example Rx beamforming method, instead of, or in addition to, determining the RP eAoA 515 based on the approximate location area 505, in step S415, the LMF 130 determines an neighbor gNB eAoA 620 based on a cell coverage area 610 of the serving gNB 120, as is illustrated in FIG. 6A. According to at least some example embodiments, the LMR 130 may determine the neighbor gNB eAoA 620 based on a cell coverage area 610 in the same manner as that by which the LMF 130 determines the RP eAoA 515 based on the approximate location area 505, as is discussed above with reference to FIGS. 4 and 5A (e.g., based on first and second neighbor gNB tangent lines 670A and 670B).

In step S420, the LMF 130 may signal the neighbor gNB eAoA 620 to the serving gNB 120 along with a UL measurement request. For example, the LMF 130 may use the same signaling structure discussed above with reference to the first example beamforming method and the RP eAoA 515 (e.g., the new ExpectedAoA IE) to signal the neighbor gNB eAoA 620.

In step S425, in response to the LMF 130 signaling the neighbor gNB eAoA 620 to the neighbor gNB 127 along with the UL measurement request in step S420, the gNB 127 may select one or more Rx beams based on the neighbor gNB eAoA 620. According to at least some example embodiments, the neighbor gNB 127 may select one or more Rx beams (e.g., second Rx beams 630 in FIG. 6B) based on the neighbor gNB eAoA 620 (and an associated uncertainty value) in the same manner in which the RP 125 selects first Rx beams 530 based on the RP eAoA 515.

For the second example Rx beamforming method, steps S430-S435 may be performed in the same manner as that discussed above with reference to first example Rx beamforming method.

Third Example Rx Beamforming Method

A third example of Rx beamforming method according to at least to some example embodiments will now be discussed below with reference to FIGS. 4, 7 and 8. The third example Rx beamforming method will be discussed with reference to a scenario in which the second wireless network 100 includes the neighbor gNB 127 and the RP 125. For simplicity of explanation, FIGS. 4, 7 and 8 are explained below, primarily, with reference to a scenario in which an eAoA is being determined for the RP 125. However, those skilled in the art will understand that the operations described below with reference to the RP 125 may be performed to determine the eAoA(s) of multiple RPs, one or more base stations (BSs), one or more gNBs, and/or one or more transmission and reception points (TRPs).

Figure 7:
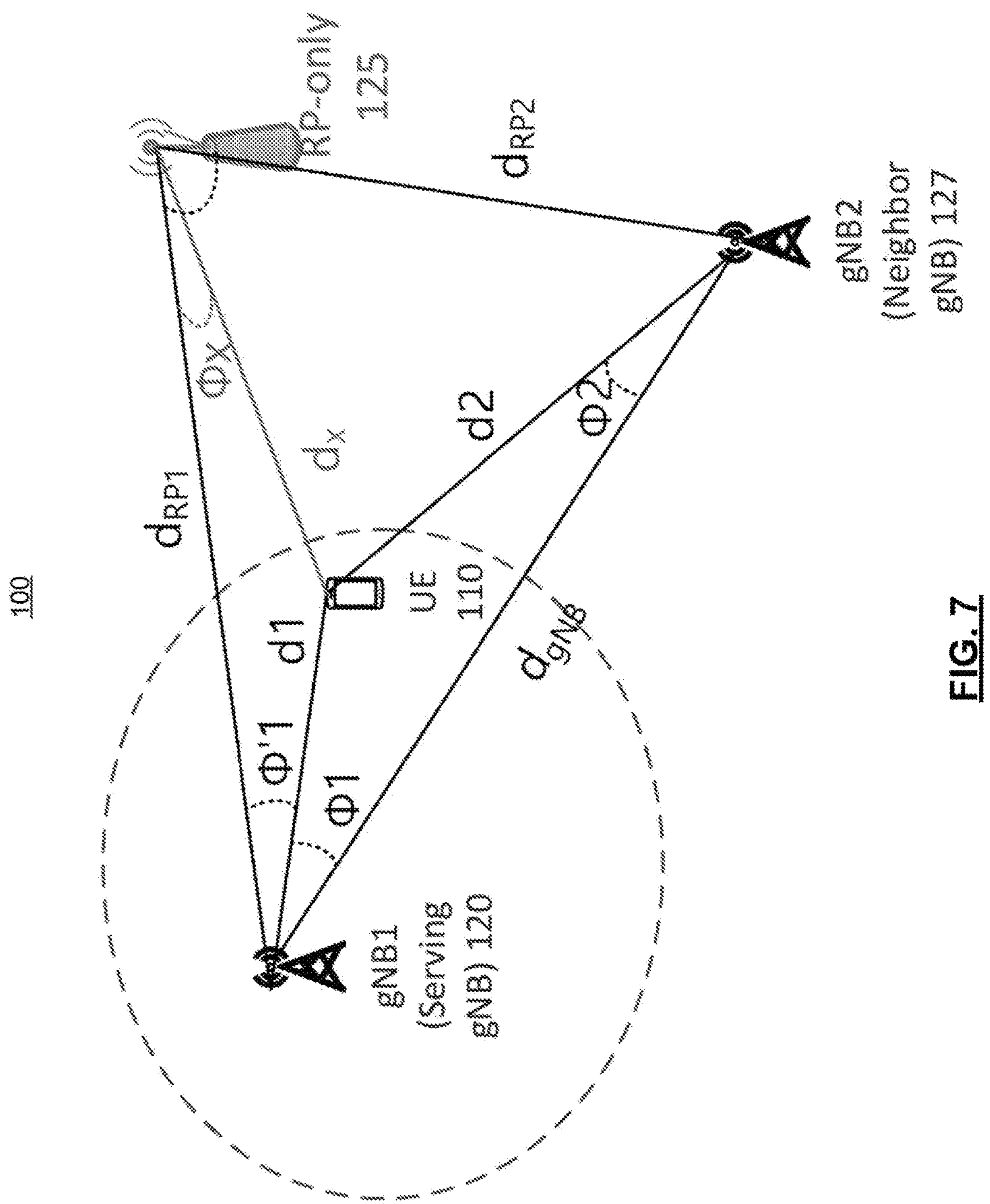
FIG. 7 is a diagram for explaining a third example method of calculating an eAoA, according to at least some example embodiments.
Figure 8:
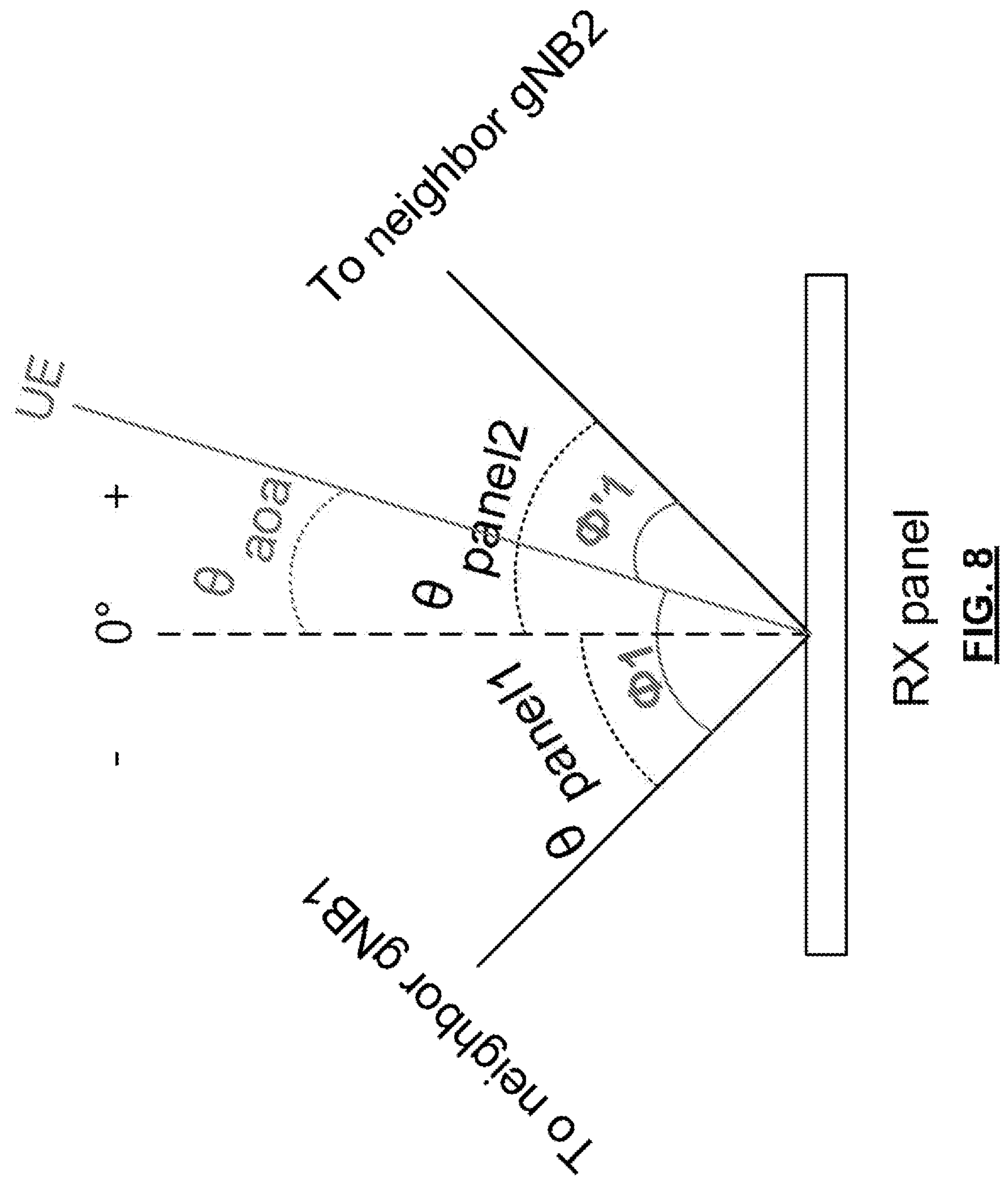
FIG. 8 is a diagram for explaining an example of angle calculation in the third example method of calculating an eAoA of FIG. 7, according to at least some example embodiments.

FIG. 7 is a diagram for explaining a third example method of calculating an eAoA, according to at least some example embodiments, and FIG. 8 is a diagram for explaining an example of angle calculation in the third example method of calculating an eAoA of FIG. 7, according to at least some example embodiments.

Referring to FIGS. 7 and 8, an example object of the third example Rx beamforming method is for the LMF 130 to derive a distance $d_x$ from the RP 125 to the UE 110 and to derive a beam steering angle $Ø_x$ of the RP 125. According to at least some example embodiments, the distance $d_x$ and beam steering angle $Ø_x$ may be derived without the RP 125 assigning any resources or making any measurements. According to at least some example embodiments, the LMF 130 can provide the RP 125 with network assistance signaling including steering angle $Ø_x$ and a distance $d_x$ for an eAoA and expected RSTD respectively, such that the RP 125 can start beam selection and positioning measurements using the signals.

According to at least one example embodiment, if two gNBs (e.g., the serving gNB 120 and the neighbor gNB 127) cooperate with respect to performing positioning measurements, the RP 125 can derive the initial values of the steering angle $Ø_x$, as well as the distance $d_x$. The steering angle $Ø_x$ and the distance $d_x$ are eventually measurement parameters of the RP 125, but an initial setting is needed. Once the UE 110 transmits SRSs, and the RP 125 receives the SRS, then positioning measurements can be updated for high positioning accuracy.

According to at least some example embodiments, the following components are measured and/or calculated:

Distance $\vec{d_1}$ from the serving gNB 120 (gNB1) to the UE 110;

Distance $\overrightarrow{d_{RP1}}$ from gNB1 to an RP-only; and

Angles $\measuredangle \emptyset_1$ (i.e., between (i) the direction of the UE 110 relative to the serving gNB 120 and (ii) the direction of the neighbor gNB 127 relative to the serving gNB 120) and $\measuredangle \emptyset'_1$ (i.e., between the (i) direction of the UE 110 relative to the serving gNB 120 and (ii) the direction of the RP 125 relative to the serving gNB 120)

$\measuredangle \vec{d_1}\ \overrightarrow{d_{gNB}} = \measuredangle \theta_{panel1} + \measuredangle \theta_{panel2}$ in FIG. 8, $\measuredangle \emptyset_1 = \measuredangle \theta_{panel1} + \measuredangle \theta_{aoa}$ in FIG. 8, and $\measuredangle \emptyset'_1 = \measuredangle \theta_{panel2} - \measuredangle \theta_{aoa}$ in FIG. 8.

First, the distance $d_x$ may be determined, for example, in accordance with Expression 1, below:

$$\vec{d_x} = \sqrt{\vec{d_1}^2 + \overrightarrow{d_{RP1}}^2 - 2\vec{d_1}\overrightarrow{d_{RP1}}\cos\measuredangle\emptyset'_1}. \quad \text{Expression 1}$$

Next, based on a triangle defined by the lines corresponding to distances $d_1$, $d_{RP1}$ and $d_x$ illustrated in FIG. 7 (i.e., $\Delta\ \vec{d_1}\overrightarrow{d_{RP1}}\vec{d_x}$) the steering angle $\emptyset_x$ may be determined, for example, in accordance with Expression 2, below:

$$\measuredangle \emptyset_x = \cos^{-1}\left(\frac{\vec{d_x}^2 + \overrightarrow{d_{RP1}}^2 - \vec{d_1}^2}{2 \cdot \vec{d_x} \cdot \overrightarrow{d_{RP1}}}\right). \quad \text{Expression 2}$$

Therefore, the LMF 130 may derive the beam steering angle $\emptyset_x$ of an RP-only (e.g., RP 125) based on Expression 1 and Expression 2 discussed above. According to at least some example embodiments, the line between the UE 110 and the serving gNB 120 (e.g., the line associated with distance $d_1$ in FIG. 7) and the line between the serving UE 110 and the neighbor gNB 127 (e.g., the line associated with distance $d_2$ in FIG. 7) each need to be a line of sight (LoS) to satisfy the triangle shape.

Also, the line (e.g., the line associated with distance $d_x$ in FIG. 7) between UE 110 and the RP-only (e.g., RP 125) may or may not be a LoS. For example, there may be some obstacle between the UE 110 and the RP 125. But the direction from RP 125 toward the UE 110 can be derived. Thus, according to at least some example embodiments, the LMF 130 (or a TRP) can collect measurements and simply provide an eAoA to aid beam management without processing localization algorithms. Also, two TRP measurements may be enough to estimate the eAoA, which may result in low complexity computation. By providing the eAoA, beam searching may be reduced. Further, the network can check through further measurements regardless of whether a line between the UE and the TRP for which the eAoA is being determined is a LoS or NLoS. Additionally, by using one or more RP-onlys (i.e., one or more RP-only APs), a location of a UE may be determined with a high degree of precision by using high accuracy positioning.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided above to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing user devices, UEs, base stations, evolved NodeBs (eNBs), remote radio heads (RRHs), next generation NodeBs (gNBs), femto base stations, small cell base stations, network controllers, computers, Central Units (CUs), Distributed Units (DUs), ng-eNBs, transmission and reception points (TRPs), reception points (RPs), other radio access or backhaul network elements, or the like. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, UEs, base stations, eNBs, RRHs, gNBs, femto base stations, network controllers, computers, Central Units (CUs), ng-eNBs, other radio access or backhaul network elements, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A method for a location management apparatus in a wireless communication system, comprising:

obtaining, at the location management apparatus, information indicating an approximate location of a user device;

generating a network assistance signaling in response to the obtained information of the approximate location of the user device; and sending the network assistance signaling to a first network apparatus in the wireless communications system, wherein the generating of the network assistance signaling comprises determining at least an expected angle of arrival for the first network apparatus and including the expected angle of arrival in the network assistance signaling, wherein the expected angle of arrival being an angle, or a range of angles, corresponding to a direction to which the user device is located relative to the first network apparatus, wherein the obtaining information indicating an approximate location of a user device comprises receiving a measurement report from a serving network apparatus serving the user device and determining the approximate location of the user device at least based on the measurement report and a location of the serving network apparatus, and wherein the measurement report comprises a measured angle of arrival indicating an angle, or range of angles, corresponding to a direction to which the user device is located relative to the serving network apparatus.

2. The method of claim 1, wherein the measurement report further comprises at least one of the following:

an estimated distance or a range of estimated distances from the user device to the serving network apparatus, an approximate location of the user device calculated by the serving network apparatus, or a cell coverage of the serving network apparatus.

3. The method of claim 2, further comprising determining the expected angle of arrival based at least on the approximate location of the user device and the location of the first network apparatus.

4. A first network apparatus, comprising:

at least one memory storing computer-executable instructions;

at least one transceiver; and at least one processor configured to execute the computer-executable instructions, wherein the computer-executable instructions, when executed by the at least one processor, cause the first network apparatus to at least perform:

receiving a network assistance signaling comprising at least an expected angle of arrival of the first network apparatus with respect to a user device from a location management apparatus in a wireless communications system, wherein the expected angle of arrival being an angle, or range of angles, corresponding to a direction to which the user device is located relative to the first network apparatus, and wherein the expected angle of arrival is an angle determined based on a combination of the range of angles and a range of distance values between the user device and a serving network apparatus;

performing positioning measurements on received uplink positioning reference signals based on the network assistance signaling; and sending a measurement report for positioning to the location management apparatus, wherein the measurement report for positioning is generated by using one or more reception beams selected by the first network apparatus based on the expected angle of arrival.

5. The first network apparatus of claim 4, wherein the computer-executable instructions, when executed by the at least one processor, further cause the first network apparatus to perform:

selecting one or more reception beams based on the expected angle of arrival, and using the selected one or more reception beams to receive uplink positioning reference signals from the user device.

6. The first network apparatus of claim 4, wherein the first network apparatus is a reception point of a network apparatus in the wireless communications system that is a non-serving network apparatus conducting positioning measurements.

7. A location management apparatus in a wireless communications system, the location management apparatus comprising:

at least one memory storing computer-executable instructions;

at least one transceiver; and at least one processor configured to execute the computer-executable instructions, wherein the computer-executable instructions, when executed by the at least one processor, cause the location management apparatus at least to perform:

obtaining information indicating an approximate location of a user device;

generating a network assistance signaling in response to the obtained information of the approximate location of the user device; and sending the network assistance signaling to a first network apparatus in the wireless communications system, wherein the determining of the network assistance signaling comprises determining at least an expected angle of arrival for the first network apparatus and including the expected angle of arrival in the network assistance signaling, wherein the expected angle of arrival being an angle, or a range of angles, corresponding to a direction to which the user device is located relative to the first network apparatus, wherein the obtaining information indicating an approximate location of a user device comprises receiving a measurement report from a serving network apparatus serving the user device determining the approximate location of the user device at least based on the measurement report and a location of the serving network apparatus, and wherein the measurement report comprises a measured angle of arrival indicating an angle, or range of angles, corresponding to a direction to which the user device is located relative to the serving network apparatus.

8. The location management apparatus of claim 7, wherein the measurement report further comprises at least one of the following:

an estimated distance or a range of estimated distances from the user device to the serving network apparatus, an approximate location of the user device calculated by the serving network apparatus, or a cell coverage of the serving network apparatus.

9. The location management apparatus of claim 8, wherein the computer-executable instructions, when executed by the at least one processor, further cause the location management apparatus to perform:

determining the expected angle of arrival based at least on the approximate location of the user device and the location of the first network apparatus.

* * * * *